United States Patent [19]

Berrito et al.

[11] Patent Number: 6,106,085
[45] Date of Patent: Aug. 22, 2000

[54] AUTOMOBILE GLOVE COMPARTMENT ORGANIZER

[76] Inventors: Michael Berrito, 429 S. Navaera, Scotts Valley, Calif. 95061; Joel Bahu, 8333 Fremont Ave., Ben Lomand, Calif. 95005

[21] Appl. No.: 09/292,544

[22] Filed: Apr. 15, 1999

[51] Int. Cl.⁷ ................................................. A47B 95/00
[52] U.S. Cl. ........................ 312/351; 296/37.12; 224/542
[58] Field of Search ..................................... 312/194, 195, 312/245, 351; 108/25, 60, 61, 91, 92, 102, 143; 211/184; 296/37.8, 37.12, 97.5, 97.8

[56] References Cited

U.S. PATENT DOCUMENTS

| | | |
|---|---|---|
| D. 166,957 | 6/1952 | Ershler . |
| D. 264,894 | 6/1982 | Halder . |
| D. 312,604 | 12/1990 | Barnes et al. . |
| D. 325,298 | 4/1992 | DiPietro et al. . |
| D. 331,213 | 11/1992 | Weinstock . |
| 1,232,500 | 7/1917 | Cleary, Jr. ............................. 312/351 X |
| 2,215,208 | 9/1940 | Burkhardt . |
| 2,301,730 | 11/1942 | Mann . |
| 2,820,687 | 1/1958 | Waring . |
| 4,099,814 | 7/1978 | Hasselberger . |
| 4,754,883 | 7/1988 | Grzywa . |
| 4,811,981 | 3/1989 | Benson . |
| 4,832,242 | 5/1989 | Leek . |
| 4,838,745 | 6/1989 | Haydock . |
| 5,025,964 | 6/1991 | Phirippidis . |
| 5,154,678 | 10/1992 | Adamczyk et al. ....................... 482/52 |
| 5,267,893 | 12/1993 | Mangigian ............................... 453/54 |
| 5,379,906 | 1/1995 | Levin et al. . |
| 5,660,311 | 8/1997 | Soltau . |
| 5,769,293 | 6/1998 | Zaretzky . |

*Primary Examiner*—Peter M. Cuomo
*Assistant Examiner*—Michael Fisher
*Attorney, Agent, or Firm*—Gray Cary Ware & Freidenrich LLP

[57] ABSTRACT

An organizer for an automobile glove compartment includes a support surface supported by one or more support members. The support surface is coated with flocked finish to prevent the items resting on it from sliding. The support surface has cut-out regions on its front edge so that the items resting on it will protrude and drivers can easily retrieve such items. The support members also act as compartment separators. The back edge of the organizer may extend so that it is flush with the back wall of the glove compartment and the items resting on the support surface will not fall off the supporting surface.

8 Claims, 13 Drawing Sheets

AUTOMOBILE GLOVE COMPARTMENT ORGANIZER

BACKGROUND OF THE INVENTION

This invention relates generally to an organizer for a compartment and in particular to an automobile glove compartment organizer.

Automobile glove compartments usually contain a single uncompartmentalized space of limited dimensions wherein a number of items may be stored. These items within a typical glove compartment, however, are usually difficult to find because the typical glove compartment does not have separate compartments and the items become bundled. It is desirable, however, to provide a space organizer to be installed in the glove compartment to divide the space in the glove compartment into several upper and lower subcompartments for storage of various articles which may be conveniently found and selected when needed.

While there are conventional glove compartment organizers, in general, for the same purpose of organizing the space in the glove compartment, it is often difficult for drivers to retrieve pieces of paper, such as a map, an automobile registration card or a proof of insurance paper, which are resting on the support surface of the conventional organizer. In particular, the driver must force his/her fingers underneath the pieces of paper thereby wrinkling or bending them.

In addition, the support surfaces of conventional glove compartment organizers are generally smooth so that items placed in the support surface may slide and become disorganized. The shapes of conventional glove compartment organizers are generally rectangular so that they may not be able to fit snugly into the glove compartments of different makes and models of automobiles. This means that the organizer is unable to utilize the entire space of the glove compartment which is already very limited and items on the organizer may still slip off of the support surface since the organizer may not be snugly fitted to the back of the glove compartment, for example.

In summary, the conventional glove compartment organizers have numerous drawbacks and limitations. They do not make it easy to grab a piece of paper resting on the support surface of the organizer without wrinkling or damaging the paper. The support surface of the conventional glove compartment organizers also has smooth surfaces so that items may slide on the support surface. In addition, the conventional glove compartment organizers do not fit snugly into the glove compartment of a variety of different makes and models of automobiles. Thus, it is desirable to provide a glove compartment organizer that overcomes the above problems and limitations described above and it is to this end that the present invention is directed.

SUMMARY OF THE INVENTION

A glove compartment organizer in accordance with the invention which overcomes the above problems with conventional organizers is provided. The glove compartment organizer may include a substantially horizontal support surface and one or more support members support the support surface and also act as compartment separators. The support surface may be horizontal or slightly angled so that a person may place items onto the support surface within the glove compartment. The organizer separates the glove compartment into one or more compartments so that items may be placed into the one or more compartments and remain in the compartments during driving conditions so that the items may be more easily located. The support surface may have one or more cut-out regions which permit a user to more easily slip one's fingers underneath a paper sitting on the support surface in the glove compartment without wrinkling or destroying the piece of paper.

The glove compartment organizer in accordance with the invention may be made of a plastic or other light-weight material and the surfaces of the organizer may be coated with a flocked finish, such as a spray velour. The flocked finish makes the surfaces of the organizer less slippery so that items resting on the surfaces of the organizer are less likely to slide. The glove compartment organizer may be manufactured in a variety of different models to fit snugly within a variety of different makes and models of automobiles. In particular, the organizer may have a back edge which is flush with the rear wall of the glove compartment so that the items resting in the upper compartments of the organizer remain there and do not slide to the back to the rear wall of the glove compartment and fall off of the support surface into one of the lower compartments making is more difficult to find the item.

In addition, the glove compartment organizer in accordance with the invention may also include a privacy door on any of the compartments in the organizer which may latched or locked by a variety of conventional means, to store valuables or other private articles. The organizer may also include one or more coin holders for storing different kinds of coins within the glove compartment. The organizer may further include one or more custom inserts for storing specific items, such as Compact Disks or audio cassettes or a pull out, clear plastic map holder which holds multiple maps and displays the top edge of the multiple maps so that the driver may easily select a particular map and then remove only the desired map.

BRIEF DESCRIPTION OF THE DRAWINGS

Further objects and advantages of the invention will become apparent from the following description and claims, and from the accompanying drawing, wherein:

DETAILED DESCRIPTION OF A PREFERRED EMBODIMENT

This invention is particularly applicable to an automobile glove compartment organizer, and it is in this context that the invention will be described. It will be appreciated, however, that the device in accordance with the invention has greater utility, such as to other types of space organizers for a variety of different spaces. For example, the invention would also be equally applicable to a glove compartment for a boat or an airplane.

Figure 1:
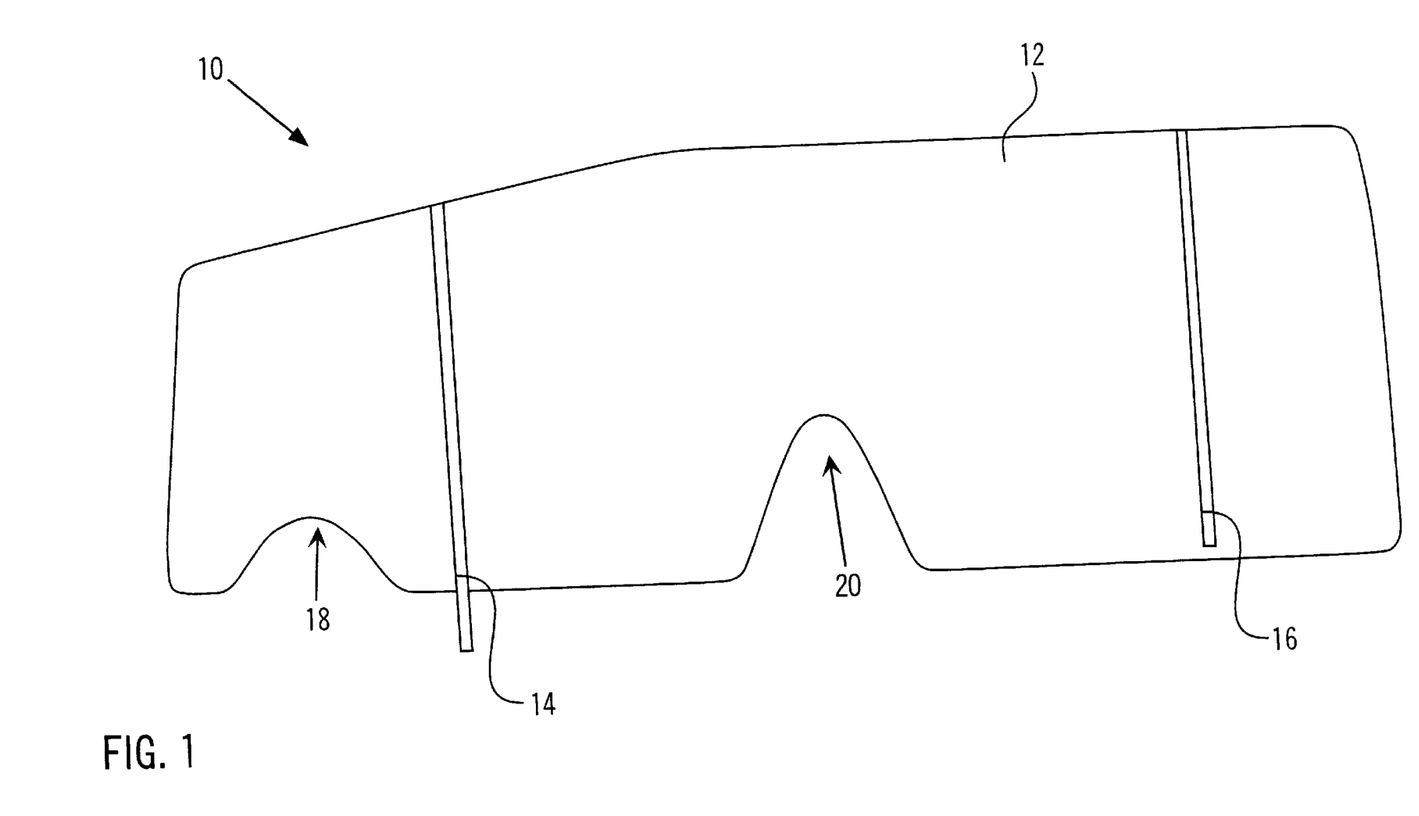
FIG. 1 is a top plan view of the glove compartment organizer in accordance with the invention.
Figure 2:
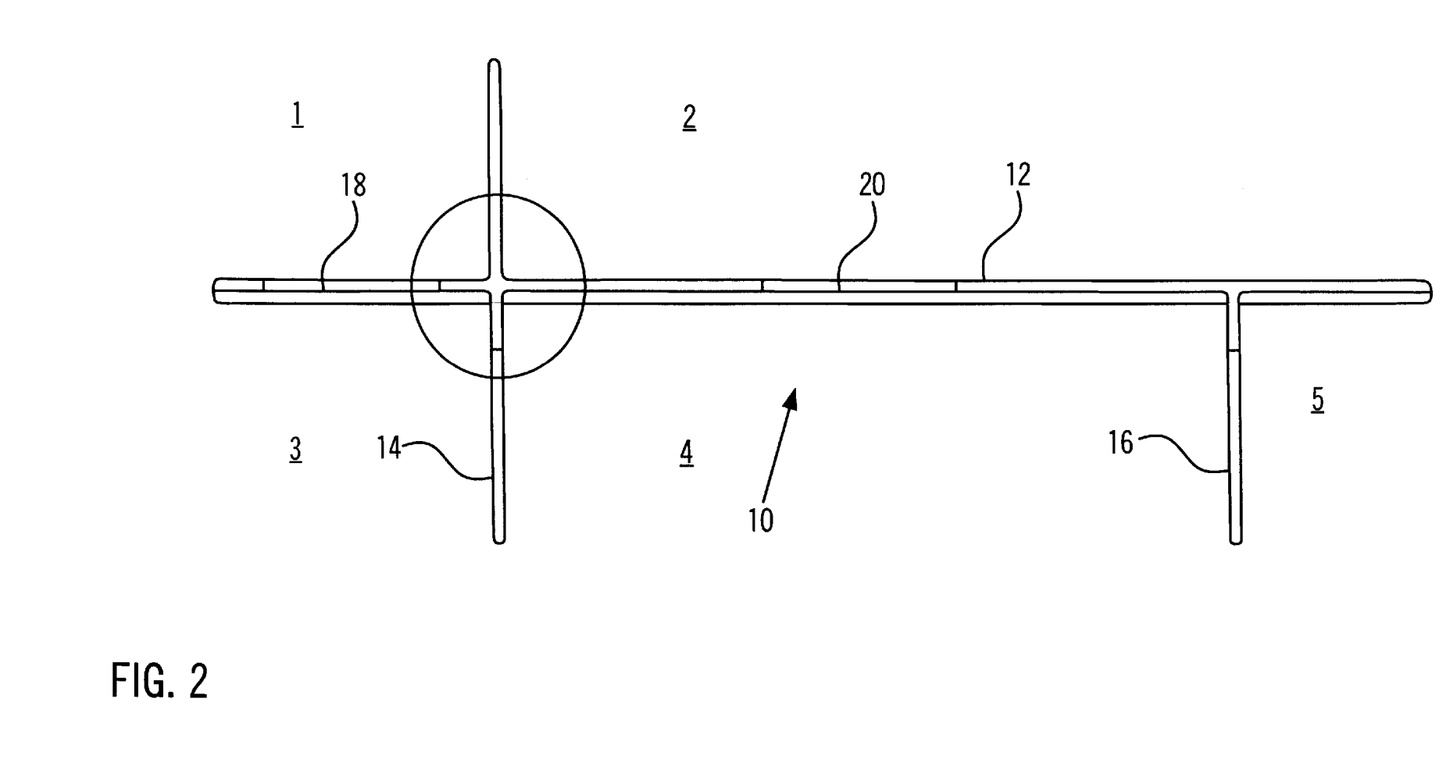
FIG. 2 is a front view in elevation of the glove compartment organizer of FIG. 1.
Figure 3:
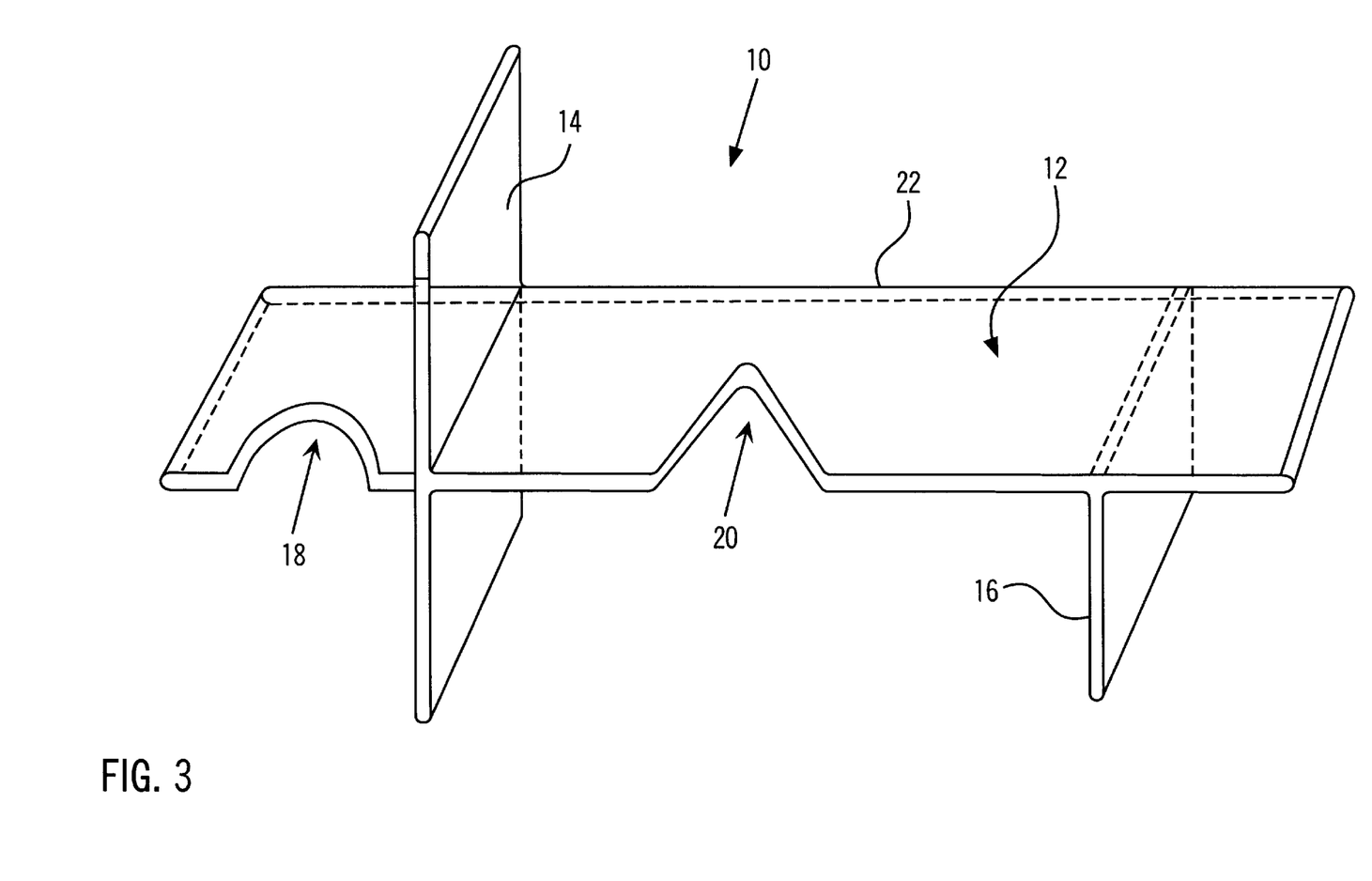
FIG. 3 is a perspective view of the glove compartment organizer of FIG. 1.

FIGS. 1, 2, and 3 are a top view, a front view, and a perspective view, respectively, of a glove box organizer 10 in accordance with the invention. The glove box organizer 10 may include a support surface 12 on which items in the glove compartment may rest. The support surface may be shaped to exactly fit within the glove compartment of a particular automobile, and may therefore be flush with the rear wall of the glove compartment. The support surface may be horizontal or angled toward the back of the glove compartment so that items on the support surface do not fall out of the glove compartment when it is opened. The glove box organizer 10 may further include first and second vertical support members 14 and 16 which support the support surface 12 a predetermined distance above the floor of the glove compartment. These support members 14 and 16 also act as compartment separators to create one or more compartments within the glove box. In the particular embodiment shown in FIG. 3, the first support member 14 may extend from the top of the glove compartment to the bottom of the glove compartment through the support surface while the second support member 16 may only extend from the bottom of the glove compartment up to the bottom of the support surface. Thus, in this example, five separate glove box compartments are created. It will be appreciated, however, that the invention is not limited to a particular number of glove box compartments, nor is it limited to the particular locations of the first and second support members 14 and 16.

In order to prevent pieces of paper which are sitting upon the support surface 12 from being wrinkled and/or destroyed when removed from the glove compartment, the support surface 12 may include one or more cut-out regions 18, 20 which permit a person to insert his or her fingers underneath the papers in order to remove them from the glove compartment without damaging or wrinkling them. In the example shown, one cut-out region 18 may be semi-circular in shape while a second cut-out region 20 may be shaped somewhat like a bell curve. It will be appreciated, however, that the invention is not limited to any particular location of the cut-out regions and/or shapes of the cut-out regions. In addition, the depth of the cut-out regions into the support surface 12 may be adjusted depending on the site of the pieces of paper which may be contained within each compartment. Thus, if a smaller piece of paper, such as an automobile registration, may be placed on the support surface in a particular compartment, the cut-out region in that compartment may be cut deeper into the support surface toward the back of the support surface to ensure that the person opening the glove compartment can still place his or her fingers underneath the car registration, for example.

The overall shape of the support surface and the support members is designed to fit flush within the glove compartment of the particular make and model of the car for which it is designed. Thus, a back edge 22 of the support surface 12 may be flush against the back of the glove compartment so that items resting on top of the support surface 12 do not fall off the back edge 22 of the organizer 10 onto the bottom of the glove compartment. Thus, each item placed within each compartment of the organizer 10 will remain in that compartment so that it is easier for the user of the glove compartment to find the items.

The support surface as well as the support members may be made of a light-weight plastic material, a light-weight metal material, or any other material which will have the properties necessary to support the items within the organizer. In order to prevent items from sliding around on the support surface 12 while the car is in motion, the support surface 12 may be coated with a surface treatment, such as a flocked finish or any other surface treatment which would roughen-up the surface of the support surface so that items do not slide on the support surface while the car is in motion. Now, several enhancements to the basic organizer 10 in accordance with the invention will be described with reference to FIGS. 4, 5a, 5b, 6a, 6b, 6c, 7a, 7b, 8, 9a, and 9b. In particular, a coin holder which may fit in one of the compartments of the glove box organizer 10 will be described; a map holder will be described; and a privacy door for one of the compartments will also be described.

Figure 4:
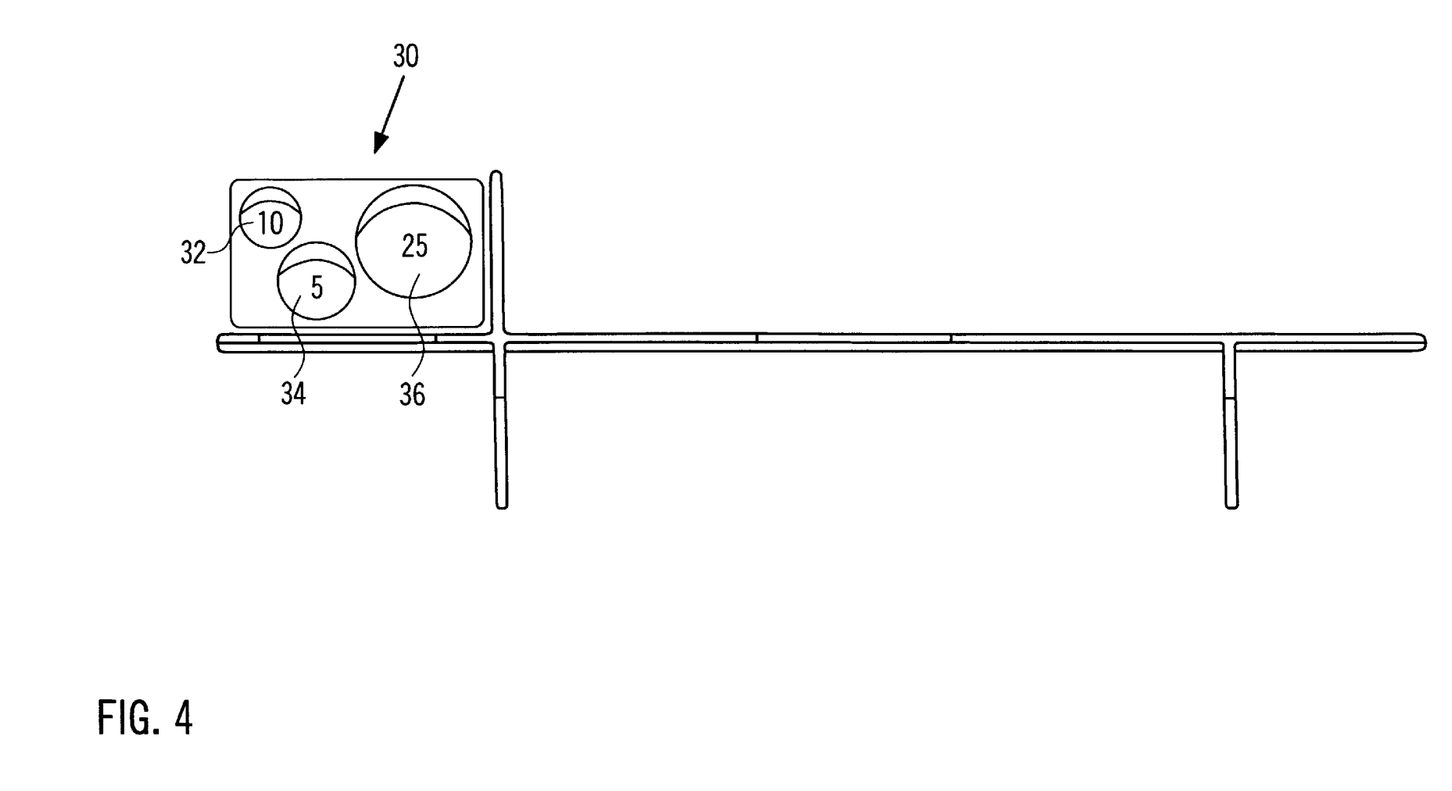
FIG. 4 is a front view of a coin holder that may be installed in an upper subcompartment of the glove compartment organizer of FIG. 1.
Figure 5A:
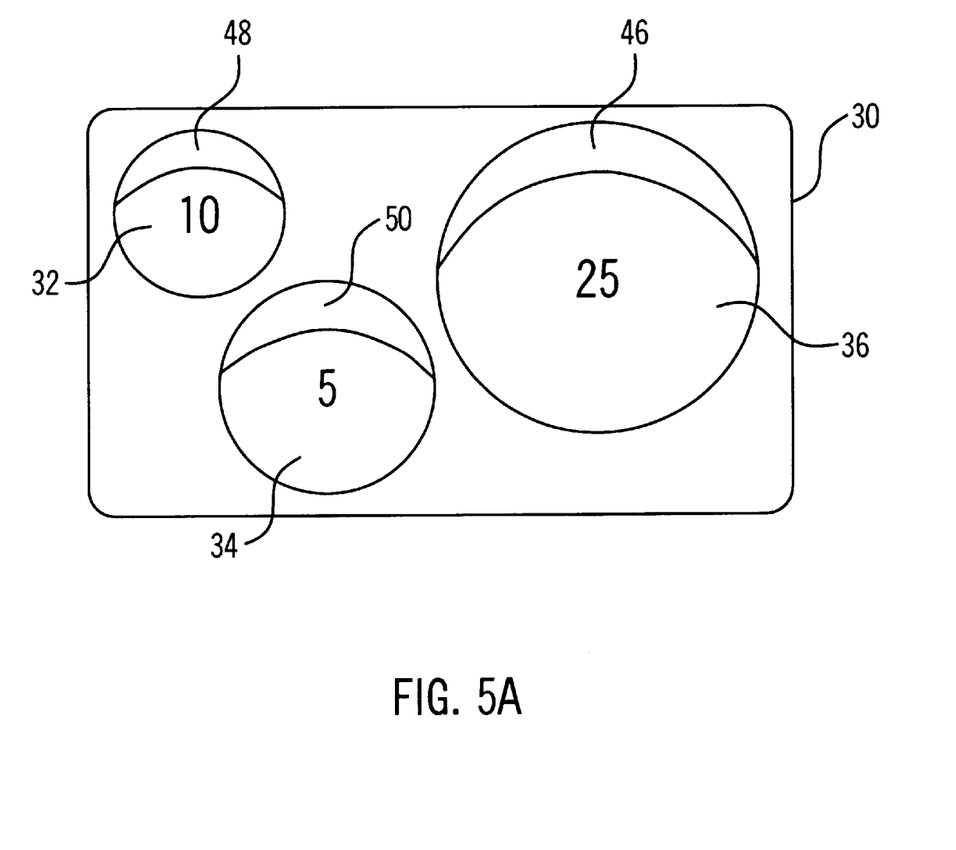
FIGS. 5a and 5b are a front view and a sectional top view, respectively, of the coin holder of FIG. 4.
Figure 5B:
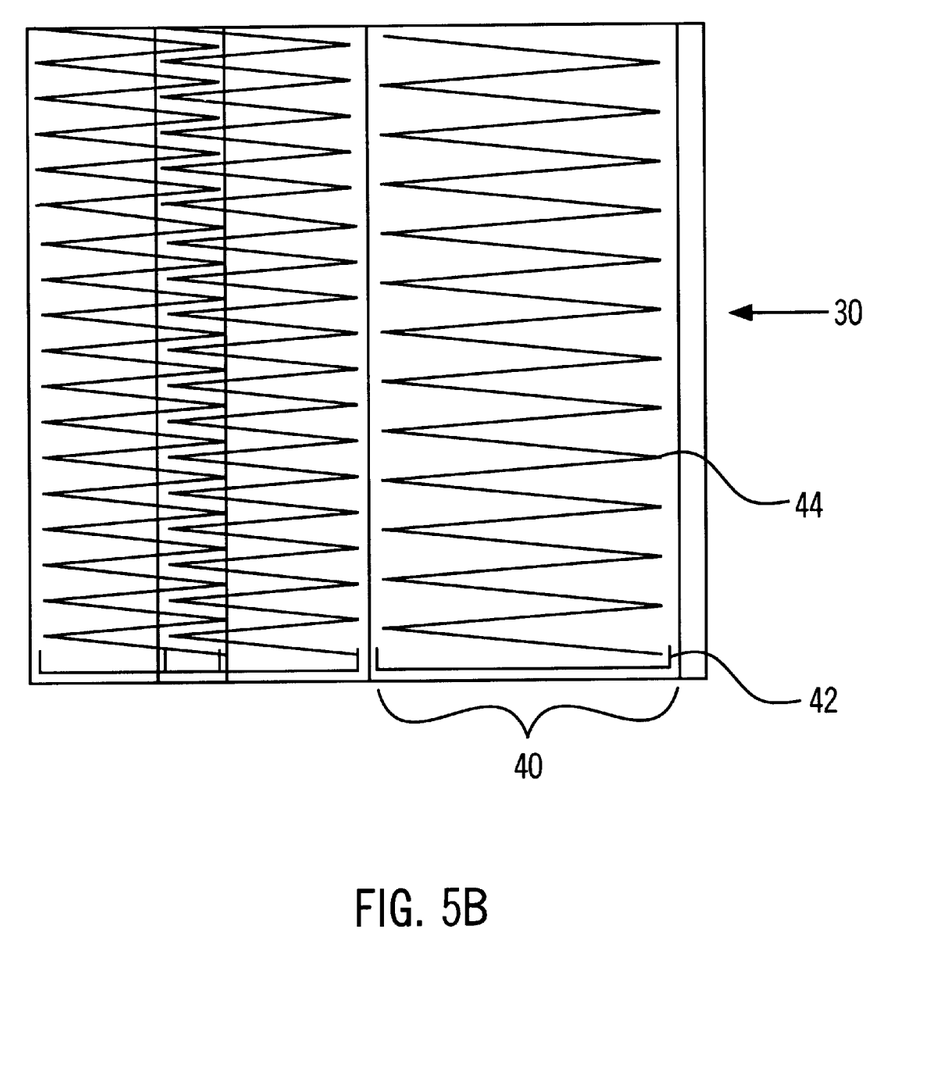

FIGS. 4, 5a, and 5b illustrate a coin holder 30 which may be included within the organizer 10 in accordance with the invention. The coin holder 30 may have a rectangular shape which fits within one of the compartments of the glove box organizer 10. The coin holder 30 may have one or more different-sized holes 32, 34, 36 in which different denominations of coins may be placed. In the example shown in FIGS. 4 and 5a, there may be a space for a dime, a nickel, and a quarter. As shown in FIG. 5b, each hole within the coin holder 30 may store a plurality of coins of that denomination. For purposes of illustration only, the mechanism for storing quarters will be describe, although it should be understood that the mechanism for storing dimes and nickels will be similar. In particular, the mechanism for storing quarters may include a channel 40 which is sized to fit a quarter, and into which quarters may be placed. The mechanism may also include a base plate 42 and a spring 44 which are located within the channel 40. The base plate 42 may be connected to the spring 44 and the spring, in turn, may be connected at its other end to the rear of the channel so that as coins are placed within the slot 36, the base plate is pushed back against the spring force of the spring 44. Thus, no matter how many quarters may be in the slot 36 at any given time, the base plate 42 and the spring 44 will push the quarters within the channel out toward the front of the coin holder 30 so that it is easy for the user to grasp a quarter. To further enhance the ability of a user to grasp a coin from the coin holder 30, each slot 32–36 may include a surface 46, 48, 50 which permits the user to grasp a coin from the channel by pressing against the surface and lifting up. In this manner, the coin holder 30 permits a user of the organizer to store excess coins in the car within the coin holder 30. Now, a map holder which may be an enhancement to the organizer in accordance with the invention will be described with reference to FIGS. 6a, 6b, 6c, 7a, and 7b.

Figure 6A:
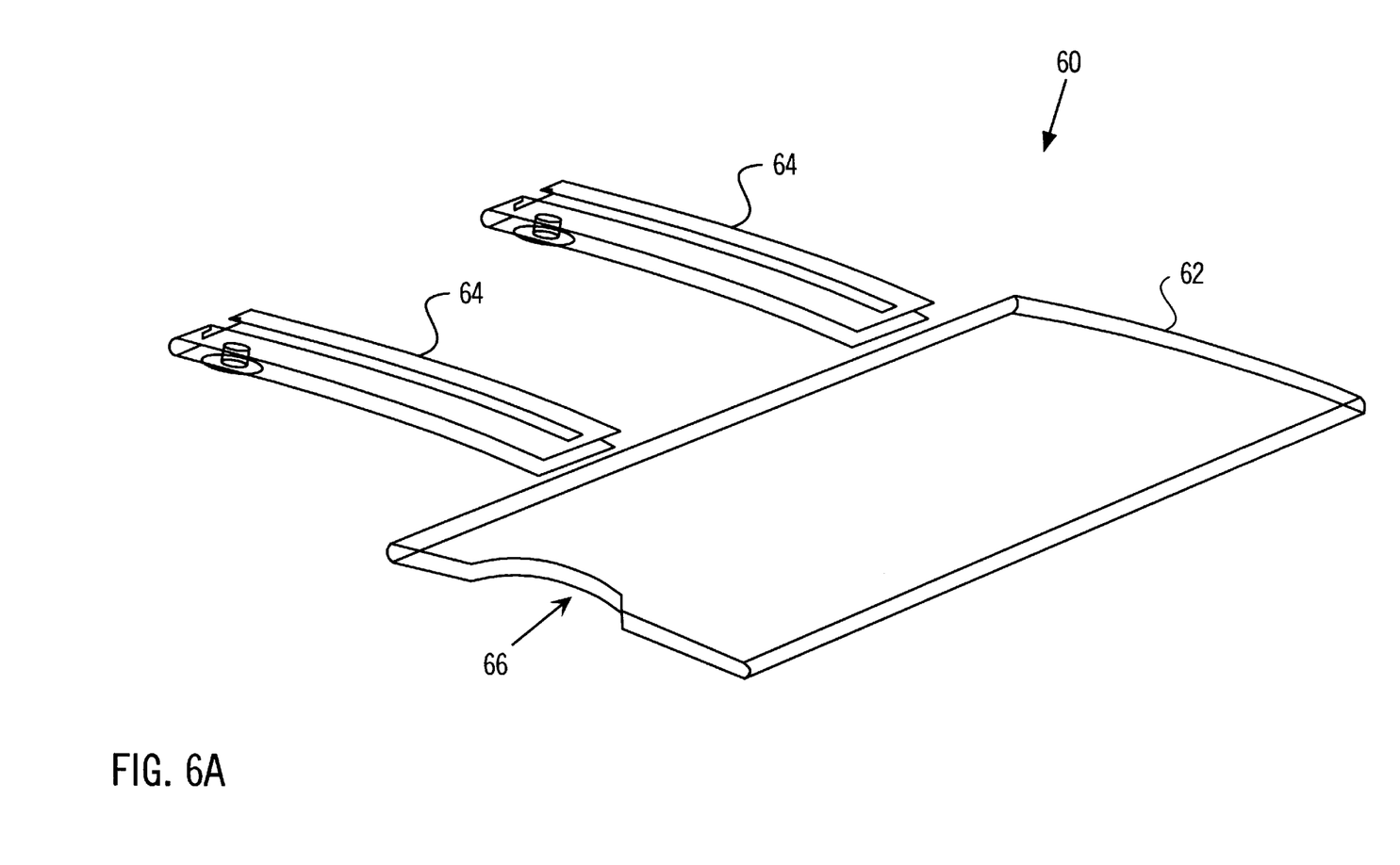
FIGS. 6a–6c are a perspective view, a top view and a side view, respectively, of a map holder that may be installed in the organizer of FIG. 1.
Figure 6B:
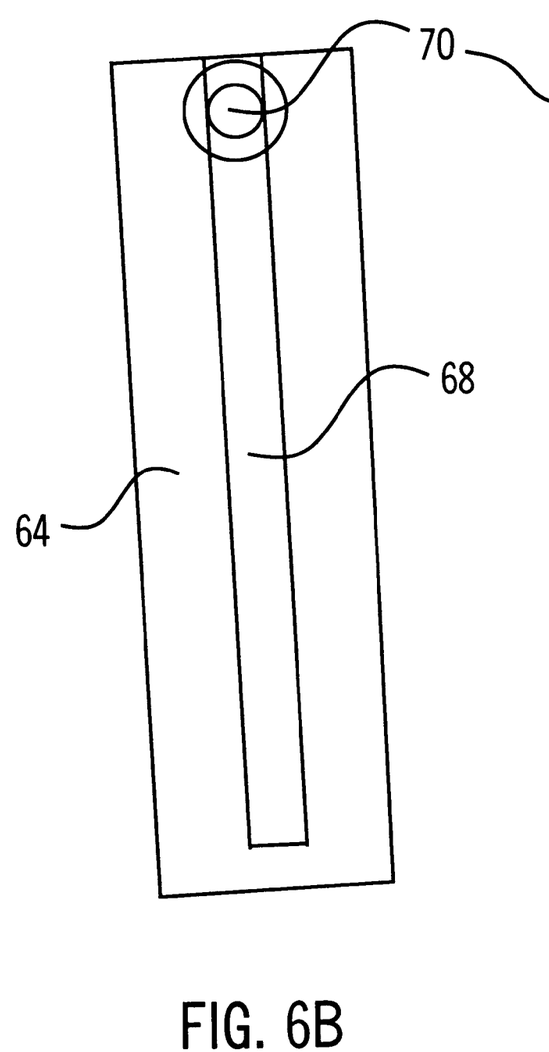
Figure 6C:
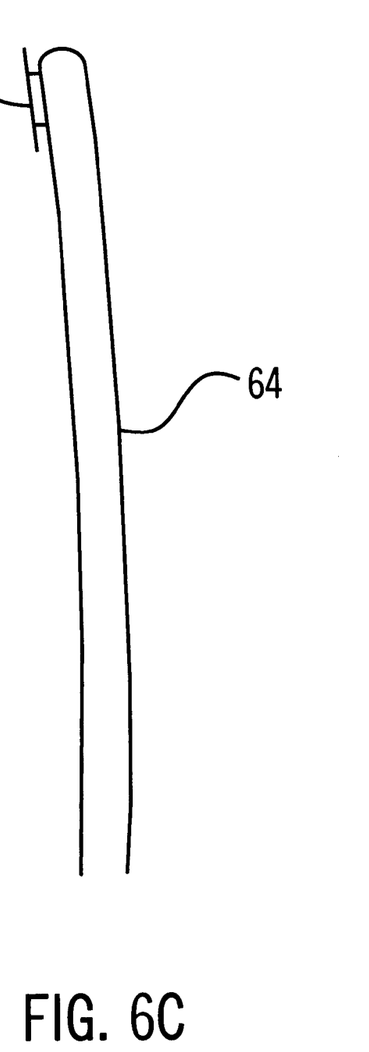
Figure 7A:
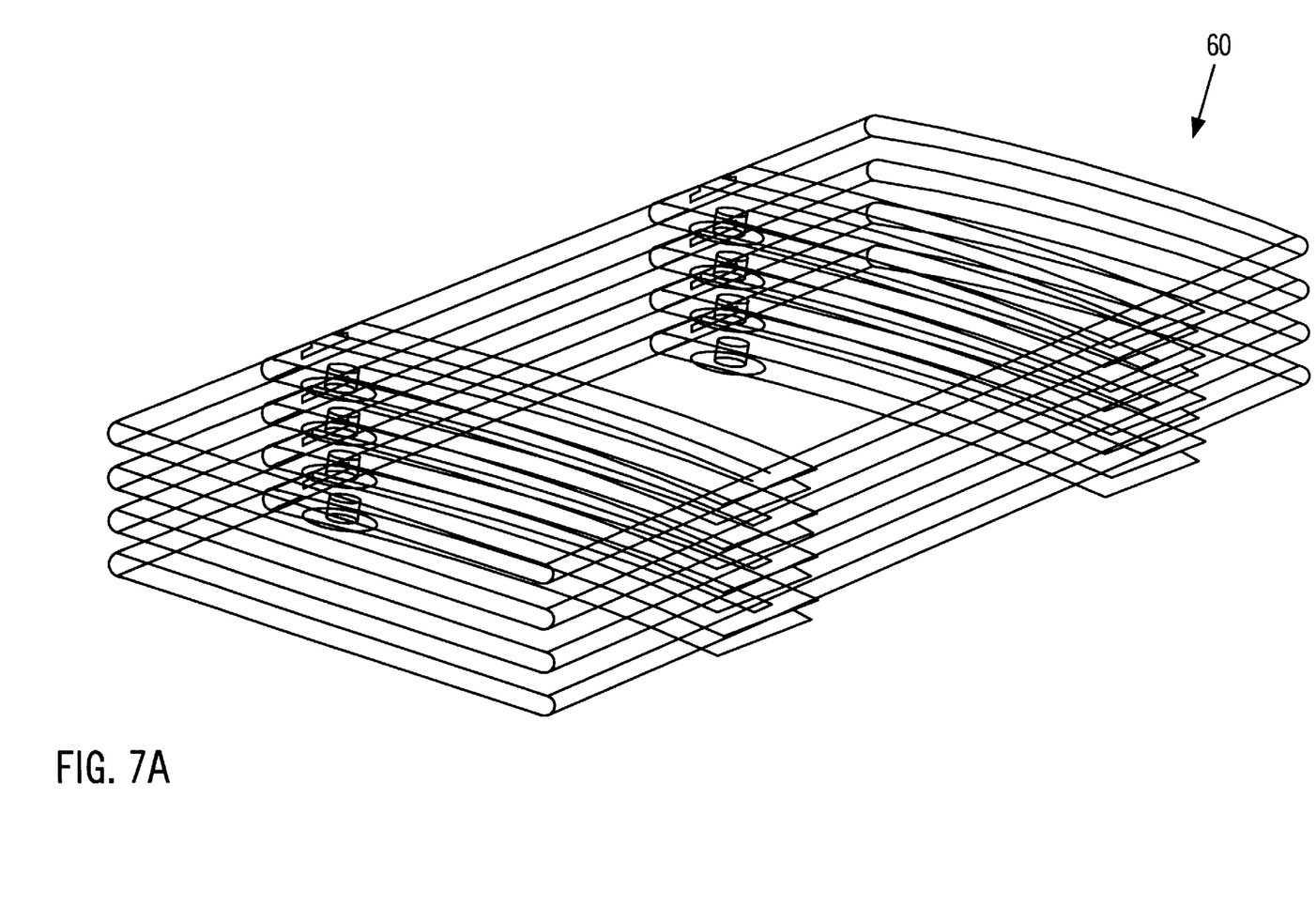
FIGS. 7a and 7b are perspective views of the map holder of FIG. 6a–6c in a closed position and in an open position, respectively.
Figure 7B:
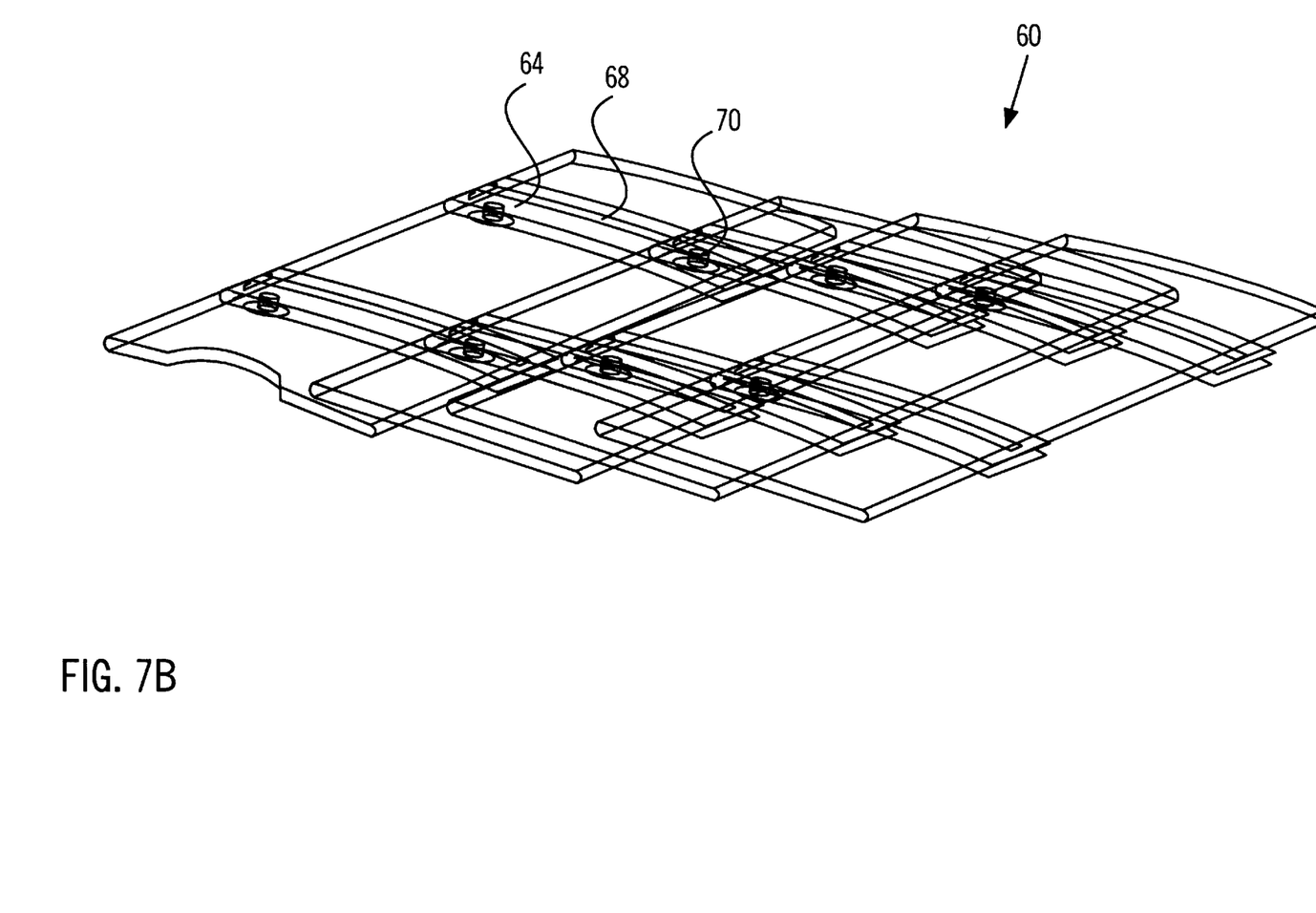

FIG. 6a is a diagram of an unassembled map holder 60 in accordance with the invention. FIG. 6b is a top view of a map holder clip 64 in accordance with the invention. FIG. 6c is a side view of the map clip 64 in accordance with the invention. FIG. 7a is a diagram illustrating the map holder 60 in a retracted position. FIG. 7b is a diagram illustrating the map holder 60 in the extended position. A map holder 60 in accordance with the invention may include a map sleeve 62 and one or more map clips 64 which attach to the sleeves so that the sleeves may slide together when stowed, as shown in FIG. 7a. The sleeve 62 may be a clear plastic sleeve which slides out under the control of the clips between each sleeve. The clear sleeve 62 permits each map within the map holder to be viewed by the user of the glove box organizer. The map sleeve 62 may also include a cut-out region 66 at one end of the sleeve so that a user may easily extract a map from the sleeve 62.

The map clip 64 may be attached to the sleeve 62 by some adhesive means. In addition, the map clip 64 on the top map sleeve 62 may be connected to the organizer or the support surface 12 to hold the map holder within the organizer 10. The details of the map clip 64 are shown in FIGS. 6b and 6c. In particular, the map clip 64 may include a channel region 68 and a button 70 which slides within the channel 68 of the other channels of the other map clips. The operation of the map holder will now be described with reference to FIGS. 7a and 7b.

Figure 7C:
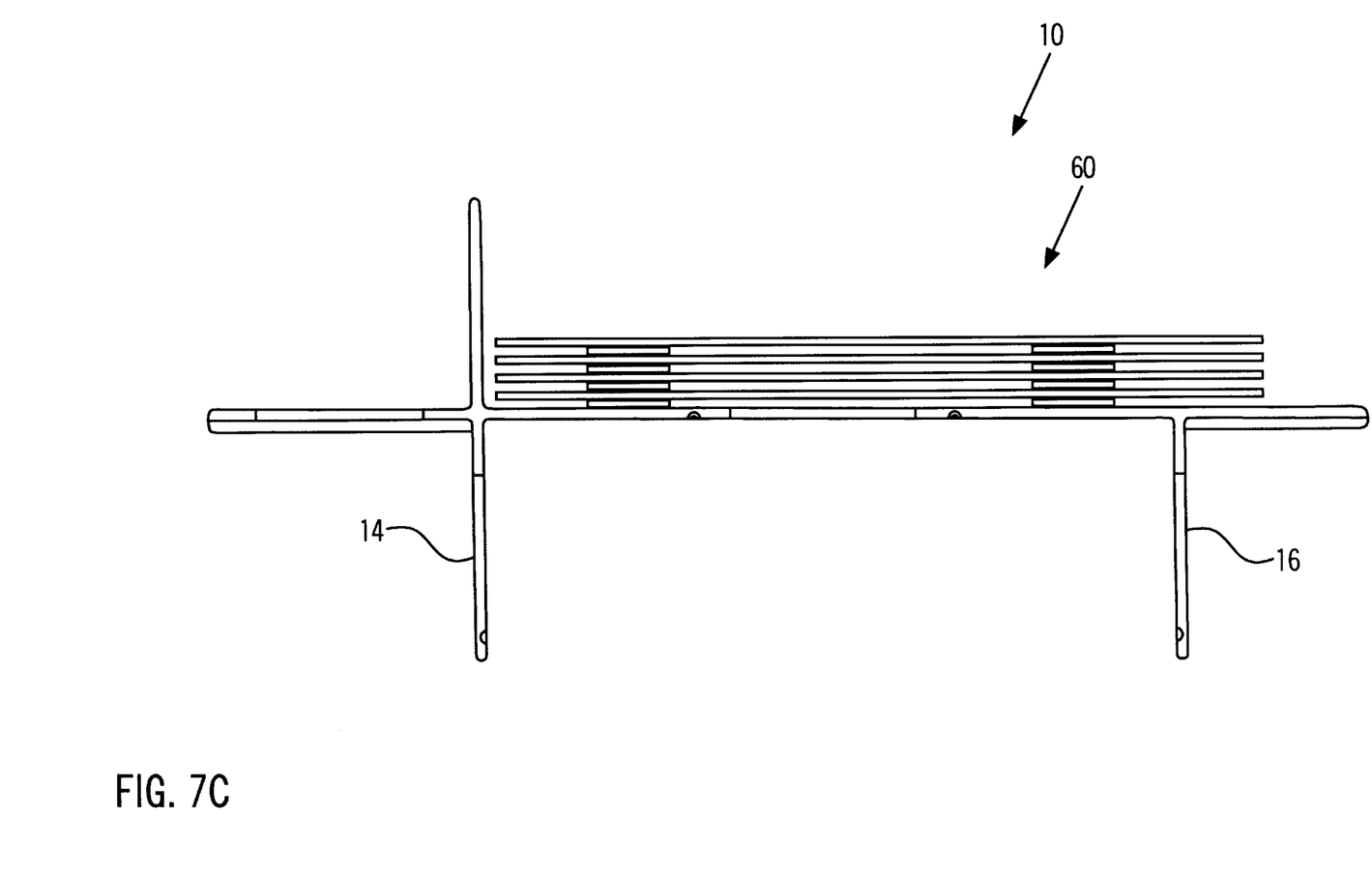
FIG. 7c illustrates the map holder of FIGS. 7a and 7b attached to the organizer.

FIGS. 7a and 7b illustrate a map holder 60 in a retracted position and in an extended position, respectively. In particular, as shown in FIG. 7a, when the map holder 60 is in the retracted position, each of the maps within each of the map sleeves is retracted so that the maps within the map sleeves are located on top of one another. As shown in FIG. 7b, when the map holder 60 is extended, the button 64 slides with the channel 68 of another map clip 64 so that the maps may be extended and easily viewed by the user. Then, the user may select a map and remove it from the map sleeve using the cut-out region 66 to grasp the map. Once the map has been selected, the map holder 60 may be pushed back so that it is in its retracted position and the glove compartment may be closed. In this manner, the user may keep one or more maps within the glove compartment separate and easily identifiable. The map holder 60 also stores these maps in a very compact space. As shown in FIG. 7C, the map holder 60 may be located within and attached to the organizer 10 so that the user may select a map. Now, a privacy door in accordance with the invention which may be added to the organizer 10 will be described.

Figure 8:
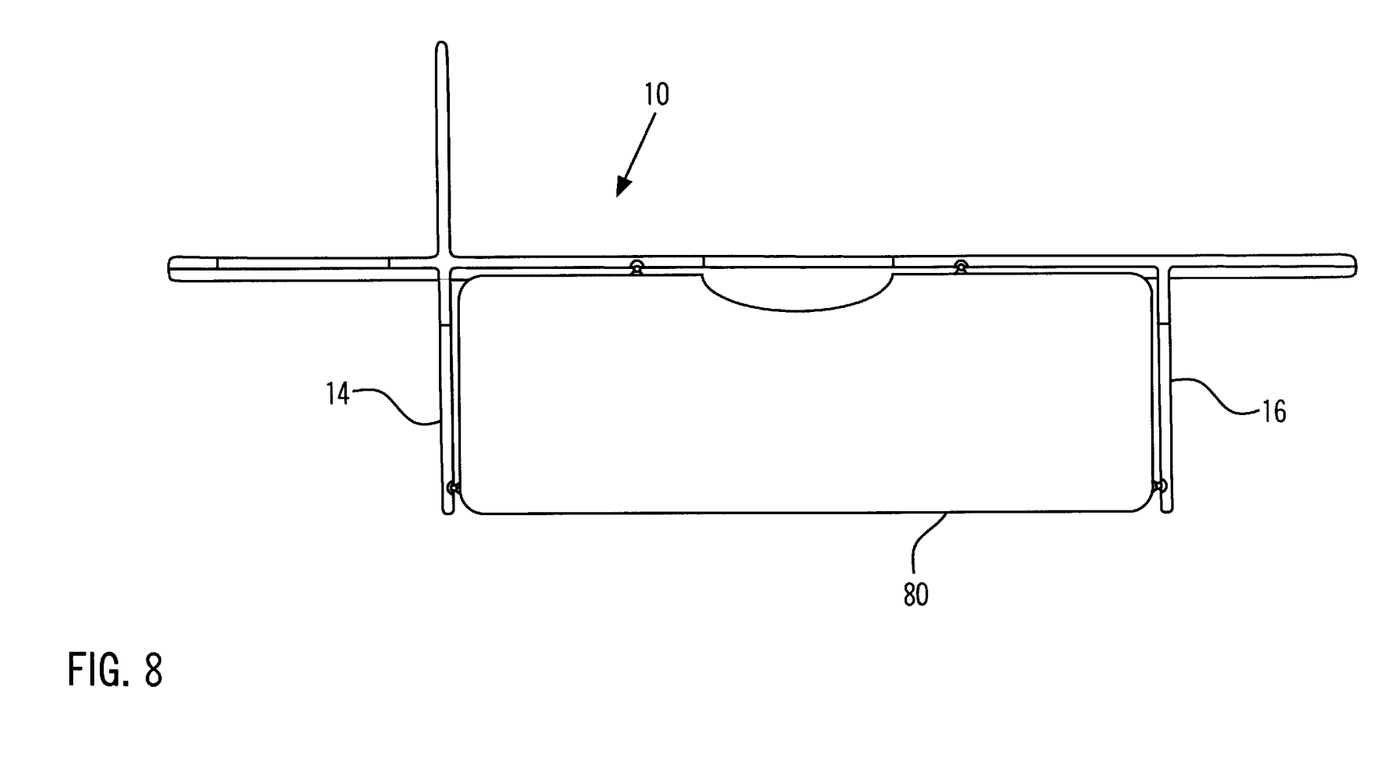
FIG. 8 is a front view of a privacy door that may be incorporated into the organizer shown in FIG. 1.
Figure 9A:
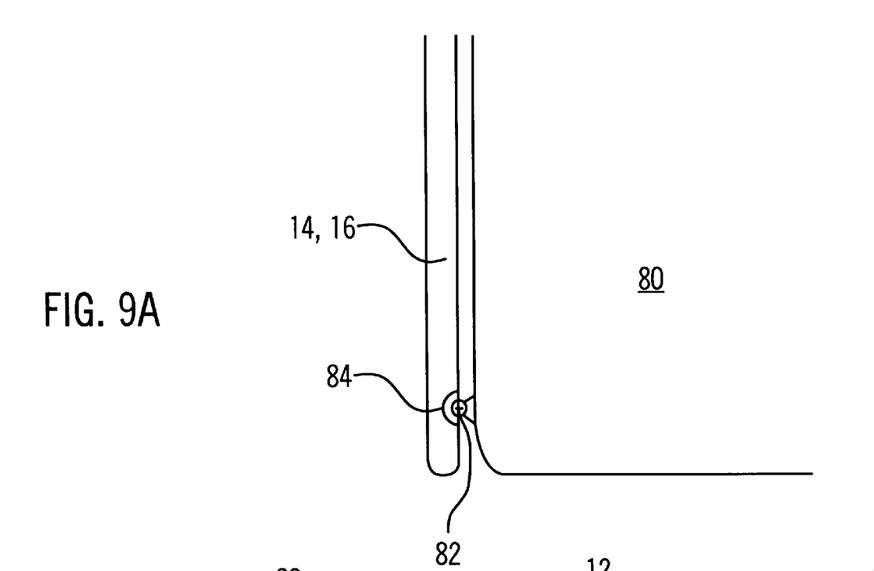
FIGS. 9a–9b are a top plain view and a side view, respectively, of the latching mechanism for the privacy door shown in FIG. 8.
Figure 9B:
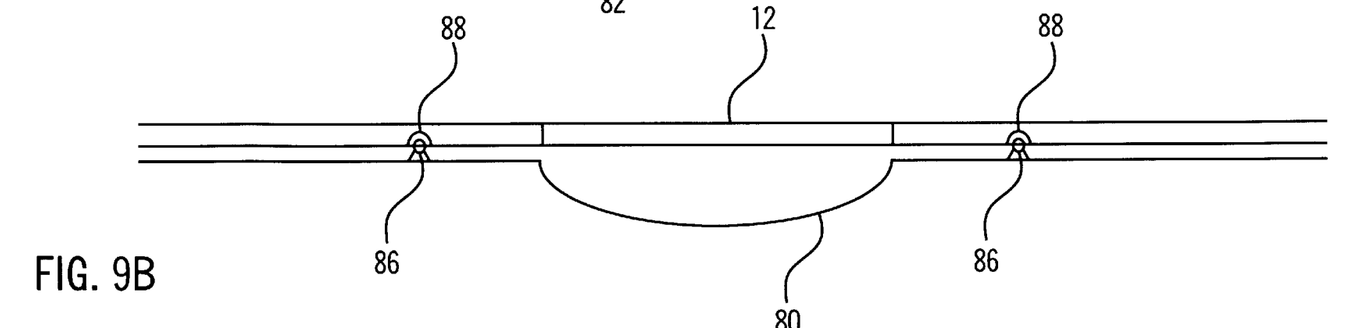

FIGS. 8, 9a, and 9b illustrate a privacy door 80 in accordance with the invention. As shown in FIG. 8, the privacy door 80 may be attached to the organizer 10 so that a compartment within the organizer may be closed. As shown in FIG. 8, the privacy door 80 may be attached to the first and second support members 14 and 16. The attachment of the privacy door to the organizer 10 will now be described with reference to FIGS. 9a and 9b.

FIGS. 9a and 9b illustrate one possible mechanism for attaching the privacy door 80 to the support members 14 and 16, as well as a way of latching the privacy door 80 closed. In particular, with reference to FIG. 9a, the privacy door 80 may include a bump 82 which fits within a pit 84 within the support members 14 and 16. The privacy door 80 may then rotate with the bump within the pit so that it may be opened and closed. FIG. 9b shows the privacy door 80 being closed against the organizer 10 in which a bump 86 on the inner surface of the privacy door 80 may fit within a cut-out region 88 within the support surface 12. It should be understood, however, that the privacy door 80 may be rotatably attached and connected to the organizer 10 by any other conventional means which will allow the privacy door to be rotated between an open and a closed position. In addition to the bump and cut-out region 86 and 88 described above, the privacy door 80 may also have a latch which latches onto the organizer or a locking mechanism which permits the privacy door to be locked with a key.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. An organizer for a glove compartment, comprising:

a support surface on which items in the glove compartment rest, the support surface having one or more cut-out regions on the front edge of said support surface which permit items on the support surface to protrude and be retrieved easily;

one or more support members which support said support surface, the support members supporting the support surface above the floor of the glove compartment and separating the space within the glove compartment into one or more compartments when the organized is inserted into the glove compartment; and a map holder attached to the organizer for holding one or more maps in the glove compartment, the map holder comprising one or more transparent sleeves into which one or more maps is placed, the sleeves sliding relative to each other so that each map may be viewed through the sleeve.

2. The organizer of claim 1 wherein the support surface comprises a surface treatment to prevent items from sliding.

3. The organizer of claim 2 wherein the surface treatment comprises the support surface coated with flocked finish to prevent items resting on the support surface from sliding.

4. The organizer of claim 1 wherein the back edge of the support surface is flush against the rear wall of the glove compartment so that the items resting on the support surface do not fall off of said support surface.

5. The organizer of claim 1, wherein the one or more support members comprise a first support member and a second support member, the first support member extends from the top of the glove compartment to the bottom of the glove compartment and the second support member extends from the bottom of the support surface to the bottom of the glove compartment to separate the space within the glove compartment into separate compartments.

6. The organizer of claim 1, wherein the support surface is angled down toward the rear of the glove compartment to prevent items from falling out of the glove compartment.

7. The organizer of claim 1, further comprising a coin holder that sits on the organizer.

8. The organizer of claim 1, wherein each sleeve has a cut-out region so that a portion of the map in the sleeve is exposed.

* * * * *